United States Patent
Wittmeyer et al.

(10) Patent No.: US 12,297,616 B2
(45) Date of Patent: May 13, 2025

(54) MODULAR CLOSED LOOP PUMPED STORAGE HYDROPOWER PLANT

(71) Applicant: Southwest Research Institute, San Antonio, TX (US)

(72) Inventors: Gordon W. Wittmeyer, San Antonio, TX (US); Biswajit Dasgupta, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 259 days.

(21) Appl. No.: 17/973,654

(22) Filed: Oct. 26, 2022

(65) Prior Publication Data

US 2024/0141607 A1    May 2, 2024

(51) Int. Cl.
*E02B 9/00*   (2006.01)
*E02B 7/14*   (2006.01)
*F03B 13/08*  (2006.01)

(52) U.S. Cl.
CPC .................. *E02B 9/00* (2013.01); *E02B 7/14* (2013.01); *F03B 13/08* (2013.01)

(58) Field of Classification Search
CPC ..... E02B 7/00; E02B 7/02; E02B 7/04; E02B 7/08; E02B 7/14; E02B 3/10; E02B 3/106; E02B 9/00; E02B 9/02
USPC .......................................... 405/107, 110, 114
See application file for complete search history.

(56) References Cited

U.S. PATENT DOCUMENTS

| | | | |
|---|---|---|---|
| 537,520 A | | 4/1895 | Bainbridge |
| 1,001,427 A | * | 8/1911 | Morton ..................... E02B 7/14 405/110 |
| 1,033,988 A | * | 7/1912 | Coburn ..................... E02B 7/14 52/314 |
| 1,047,501 A | * | 12/1912 | Colpitts .................... E02B 7/14 405/112 |
| 2,566,748 A | * | 9/1951 | Ringrose .................. E04H 7/18 405/114 |
| 2,962,599 A | * | 11/1960 | Pirkey ..................... F03B 13/06 290/43 |

(Continued)

FOREIGN PATENT DOCUMENTS

AU  2021218243 A1 * 5/2022
BR  102014012298    * 1/2016

(Continued)

OTHER PUBLICATIONS

Tawsif Chowdhury "Overview of Pumped Hydroelectricity Storage System to Produce Clean Energy," Feb. 2021. (Year: 2021).*

*Primary Examiner* — Frederick L Lagman
(74) *Attorney, Agent, or Firm* — Verrill Dana, LLP

(57) ABSTRACT

A modular component dam. The dam may be configured for pairing with another dam in the form of a closed loop pumped storage hydropower plant. One or both of the dams may be constructed of buttress frames made up of prefabricated modules of predetermined varying dimensions which allow for rapid construction over a period of less than about a year. The modules may be transported to dam sites by standard transportation units such as 18 wheelers. This is facilitated by the modules occupying no more than about 14 feet in vertical height above a surface of a roadway during transport and no more than about 11 feet in horizontal width across the roadway during transport.

5 Claims, 7 Drawing Sheets

(56) References Cited

U.S. PATENT DOCUMENTS

| | | | | |
|---|---|---|---|---|
| 4,109,160 | A * | 8/1978 | Goto | F03B 13/06 |
| | | | | 415/17 |
| 4,132,901 | A * | 1/1979 | Crausbay | E02B 9/00 |
| | | | | 417/330 |
| 6,000,880 | A * | 12/1999 | Halus | E02B 9/00 |
| | | | | 405/36 |
| 6,022,172 | A * | 2/2000 | Siyaj | E02B 3/108 |
| | | | | 405/110 |
| 6,079,904 | A * | 6/2000 | Trisl | E02B 3/106 |
| | | | | 405/116 |
| 7,866,919 | B2 * | 1/2011 | Miller | F03B 13/06 |
| | | | | 405/80 |
| 8,858,120 | B2 * | 10/2014 | Allen | E02D 27/016 |
| | | | | 405/110 |
| 9,103,084 | B2 * | 8/2015 | French, Sr. | E02B 8/06 |
| 9,708,786 | B2 * | 7/2017 | James | E02B 3/108 |
| 2005/0034452 | A1 * | 2/2005 | Davis | F03B 3/103 |
| | | | | 60/398 |
| 2013/0149037 | A1 * | 6/2013 | Yu | E02D 29/0266 |
| | | | | 405/16 |
| 2024/0218623 | A1 * | 7/2024 | French, Sr. | F03B 15/14 |

FOREIGN PATENT DOCUMENTS

| | | | | |
|---|---|---|---|---|
| CN | 106836144 A | * | 6/2017 | E02B 7/06 |
| DE | 202013011141 U1 | * | 12/2014 | E02B 9/00 |
| KR | 101047337 B1 | * | 7/2011 | |
| KR | 20160134158 A | * | 11/2016 | |
| KR | 20190041565 A | * | 4/2019 | |

* cited by examiner

MODULAR CLOSED LOOP PUMPED STORAGE HYDROPOWER PLANT

BACKGROUND

Meeting energy demands for a growing population is becoming an increasingly challenging endeavor. Whether country to country or on a worldwide-basis, as industrialized populations increase, so too does demand for energy. Once more, meeting demand may present challenges apart from merely increasing energy supplies. For example, efforts are often directed at improving efficiency in terms of energy management and in supplementing conventional energy supplies, for example, with newer alternative energy sources such as wind and solar.

One manner of capturing and storing energy from supplemental intermittent energy sources is to utilize pumped storage hydropower systems. This type of system may also be utilized to save surplus or excess energy from traditional continuous sources such as coal or nuclear. Either way, these systems allow for the collecting and saving of energy for periods of higher demand.

A closed loop pumped storage hydropower plant is a hydroelectric system that allows for energy to be stored in the form of gravitational potential energy of water. Specifically, water may be pumped from a lower elevation reservoir to a higher elevation reservoir during periods of high availability relative to demand. Pumps utilized to achieve this movement of water to the higher elevation reservoir may be run on energy supplied by more intermittent sources or by surpluses from more traditional sources as noted above. Thus, during periods of higher energy demand or "peak" demand, the water stored at the higher elevation may be released through turbines to produce electrical power as the water is gravitationally directed back to the lower elevation reservoir.

Unfortunately, construction of multiple reservoirs to complete a closed loop pumped storage hydropower plant can be quite expensive and time consuming. For example, costs may run between about $50 million to a billion dollars and it may take upwards of 5-10 years to complete construction and begin operations. This is a significant amount of money, particularly when considering that recouping and eventually profiting from such a venture might take a decade.

One of the challenges in terms of the length of time to complete such projects relates to environmental concerns. Specifically, depending on the proposed plan site, there may be a substantial number of environmental impact study requirements. For example, sites which are suitable to accommodate such systems may cover hundreds to thousands of acres in hilly or mountainous regions where water availability is consistent. This means that the sites are likely to be sensitive in terms of wildlife, scenery and overall ecology. Thus, even in circumstances where construction time might be kept to a minimum, approval for construction and operations is unlikely to occur in under about five years in most cases.

In light of the delays associated with constructing and operating such systems, new regulations have been implemented with the potential to reduce the approval process time down to two years. More specifically, in the U.S., where the proposed system site avoids tributaries and meets a variety of other pre-conditions, it is now possible to take advantage of an expedited approval process that may result in an approval in about two years.

With the availability of expedited review and approval, added pressure is now brought to bear on construction time. That is, an expedited review means that delays to obtaining a return on investment may now lean more heavily on construction time in many circumstances. Once more, costs of construction using standard methods remains high as noted above, even with the opportunity to potentially recover costs more quickly.

SUMMARY

Embodiments of a modular system for a reservoir of a closed-loop pumped storage hydropower plant are disclosed. The system includes a plurality of structural steel buttresses made up of modules of varying dimensions. A transport unit is included to accommodate any one of the modules for transport across a roadway, any of the modules occupying no more than about 14 feet in vertical height above the roadway and no more than about 11 feet in horizontal width across the roadway during the transport.

DETAILED DESCRIPTION

Embodiments are described herein with reference to certain types of closed loop hydropower systems. More specifically, systems that utilize two or more cooperating reservoirs to store power for use at a predetermined time such as when power needs are at a peak. However, it should be noted that the embodiments detailed herein may be utilized to enhance transport and assembly efficiencies for a variety of other dam construction projects. Indeed, so long as a dam is transported and constructed of modular components of predetermined dimensions that allow for no more than 14 feet in height above a path surface and no more than 11 feet in width during transport, appreciable benefit may be realized.

Figure 1:
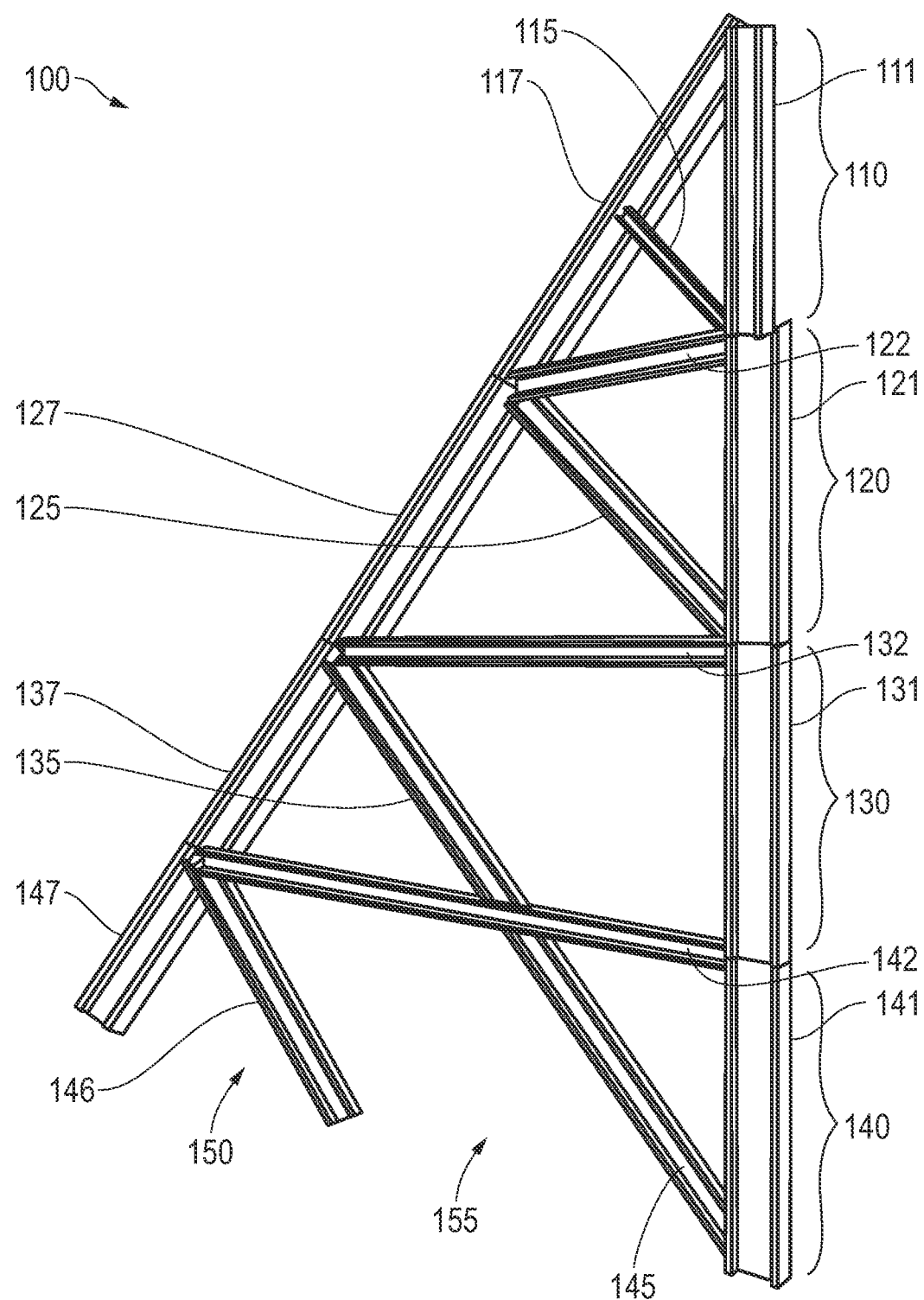
FIG. 1 is a side perspective view of an embodiment of a steel buttress dam frame of modular construction.

Referring now to FIG. 1, a side perspective view of an embodiment of a steel buttress dam frame 100 is illustrated that is of modular construction. Specifically, for the embodiment shown, the frame 100 is made up of four different modules 110, 120, 130, 140. However, fewer or more modules 110-140 may be utilized in constructing such a frame 100 (as illustrated in FIG. 2A-2D). Each module 110-140 may be assembled offsite at a steel fabrication shop and transported to the construction site as detailed below. With added reference to FIGS. 3 and 4, the frame 100 is one of a plurality of frames 100 that may be utilized in constructing a dam 300, 550 for a reservoir 500, 525.

Figure 6:
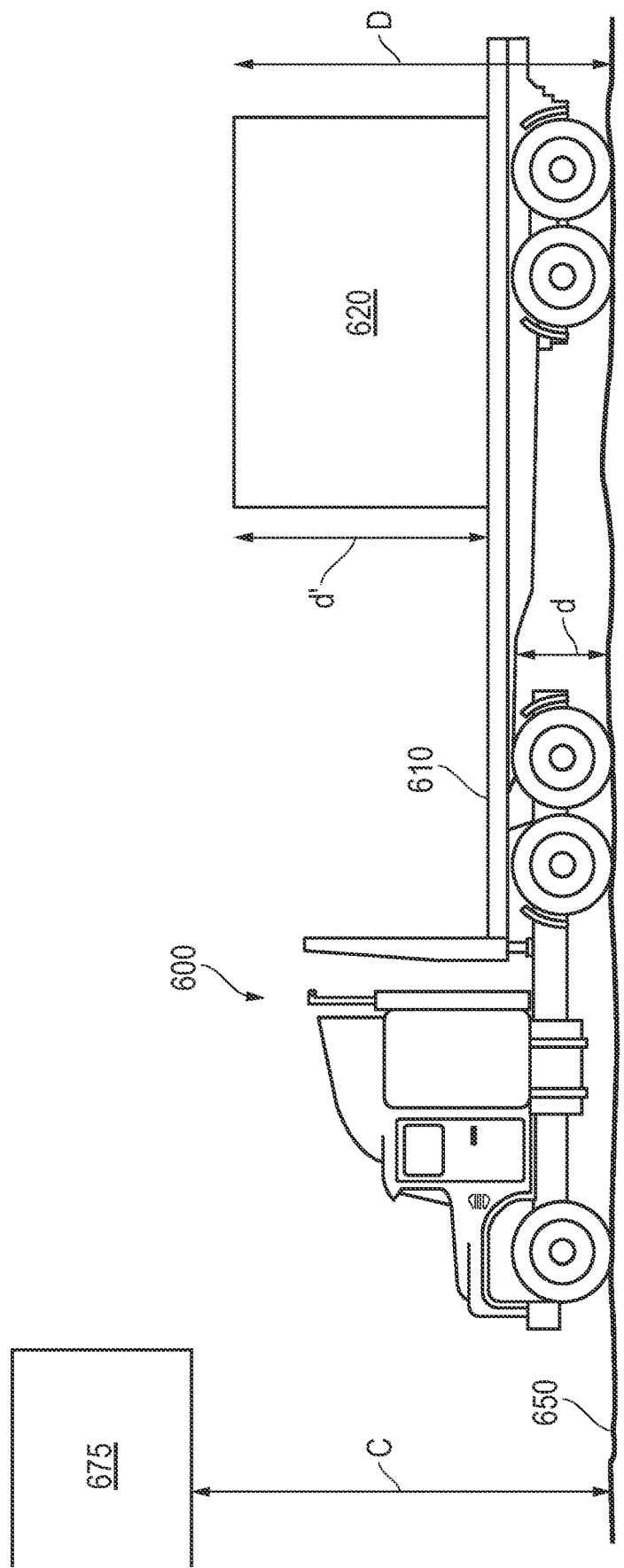
FIG. 6 is a side view of a transport unit accommodating a module for a frame to facilitate construction of a dam as illustrated in FIGS. 3-5B.

The uppermost module 110 of the frame 100 is constructed of a vertical member 111 that is between about eight and twelve feet in height, perhaps closest to about ten feet and likely under about 11 feet. With added reference to FIG. 6, this means that a package 620 securing one or more such modules 110 may be positioned at a transportation unit 600 in a manner that is unlikely to present transportation clearance issues. For example, the embodiment of FIG. 6 illustrates a standard 18-wheeler truck as the unit 600 with a flatbed 610 that is below about four feet from the surface of a path 650 such as a roadway as illustrated. This means that even where a clearance (C) at an overpass 675 is presented that is no more than a standard Department of Transportation (DOT) minimum of about 14 feet, the unit 600 and package 620 should still be able to pass under the overpass 675 without incident. That is, with a height of the package 620 (d') being close to ten feet the total elevation (D) over the surface of the path 650 would be under 14 feet for a standard flatbed 610 which itself is generally under about four feet in height (d). Of course, this is only exemplary as a variety of other packing modes may be available as detailed further below.

Continuing with reference to FIG. 1, the uppermost module 110 also includes face 117 and support 115 members with the face members 117 inclined for facing a reservoir body and the support members 115 for bracing the module. The width of the module 110 may be based on the inclined configuration of the face members 117. Regardless the particular nature of the members, in each case, the members 111, 115, 117 may be of standardized structural steel commonly utilized for such applications. Further, the module 110 may be supplied as an entirely prefabricated item tailored for transportation as described above and for ease of assembly with the remainder of the frame 100 as illustrated. Gusset plates 270 at member joints and base plates 270 at footing locations may also be provided as part of the prefabrication process.

A first middle module 120 is shown below the upper module 110 for the frame 100 of FIG. 1. This module 120 is similar to that of the upper module 110. For example, the vertical member 121 may also be under about 11 feet in height with face 127 and support 125 members also provided. Again, the face member 127 may be angled at the same inclination as that of the upper module 110. Horizontal 122 and support 125 members may again be included, likely in the form of steel T-sections. The width of the module 120 is configured based on the total height of the modules 110, 120 combined along with the noted angle of inclination for the face members 117, 127. In one embodiment, the horizontal member 122 is under about 11 feet in width, perhaps about ten feet to match the width of the uppermost module 110 at its base (e.g. with the uppermost module 110 having a vertical member 111 that is about the same as the width at its base).

A second middle module 130 is provided below the first middle module 120. In the embodiment shown, this module 130 takes on a similar architecture to that of the first middle module 120. That is, a vertical member 131 is provided that is again under about 11 feet, perhaps close to ten feet. Support 135 and face 137 members are also provided along with a horizontal member 132 or brace support.

In the embodiment shown, a last base module 140 is shown. Again, a vertical member 141 is provided that is under about 11 feet, perhaps close to ten, with a face member 147 and another horizontal member 142 or T-section. In this case, the increasing width of the module 140 has resulted in the use of multiple support members 146, 145. In this case, the forward support member 146 interfaces a location where face members 137, 147 meet for support. The rearward support member 145 is anchored to the base of the vertical member 141 such that load through the support member 135 of the second middle module 130 from its support member 135 may be translated through the rearward support member 145 to the anchored location. It is of note that below the base module 140, there is no horizontal member. Instead, open locations 150, 155 are found. This is because a member across these locations may provide minimal if any additional load bearing support where the module 140 includes anchored footings 280, 285, 287 (e.g. see FIG. 2D). Thus, adding the weight and expense of such a member may be avoided if desired.

Figure 2A:
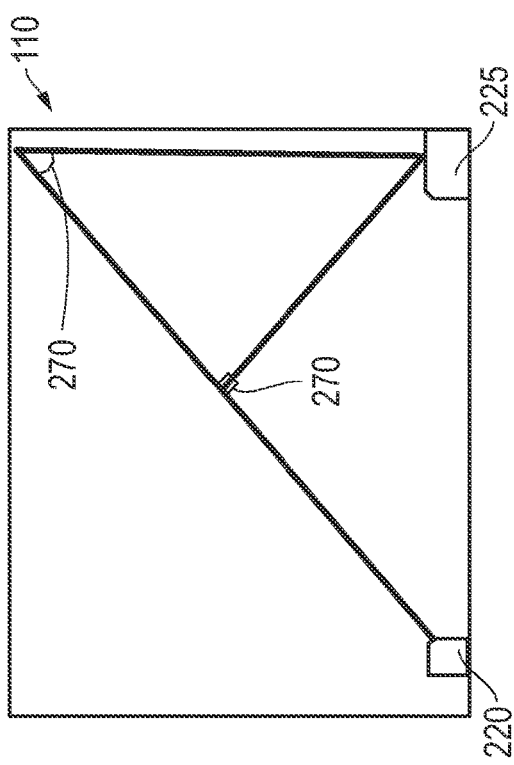
FIG. 2A is a side schematic view of an uppermost module for the frame of FIG. 1.
Figure 2B:
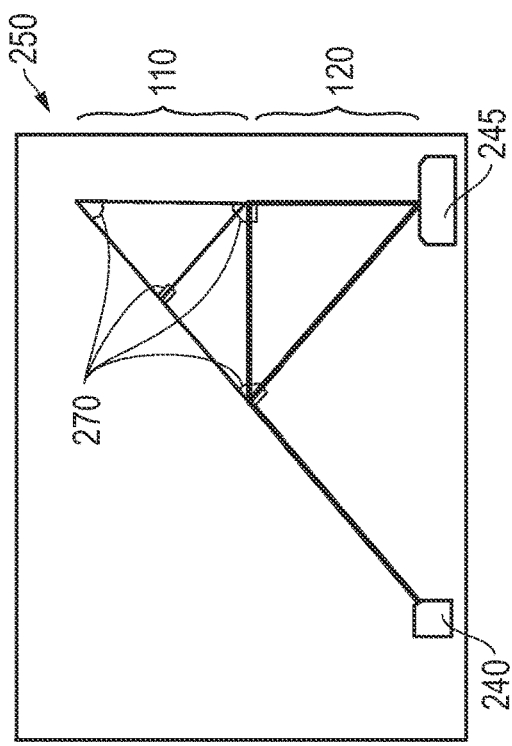
FIG. 2B is a side schematic view of a first middle module for the frame of FIG. 1 accommodating the uppermost module of FIG. 2A.
Figure 2C:
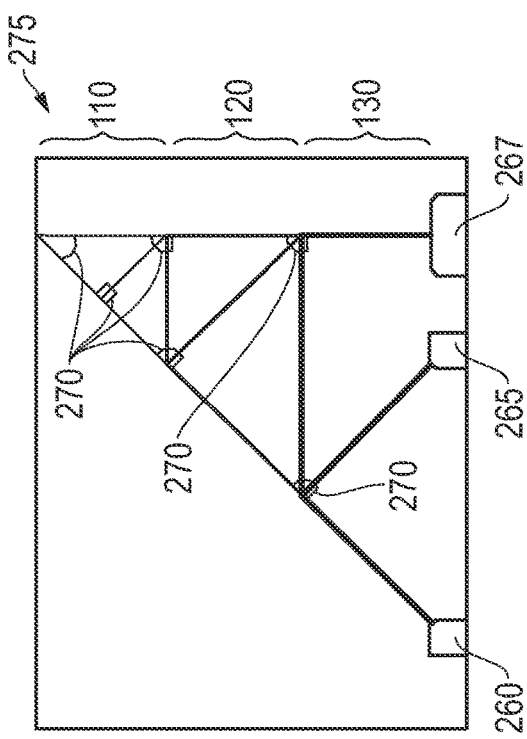
FIG. 2C is a side schematic view of a second middle module for the frame of FIG. 1, accommodating the modules of FIGS. 2A and 2B.
Figure 2D:
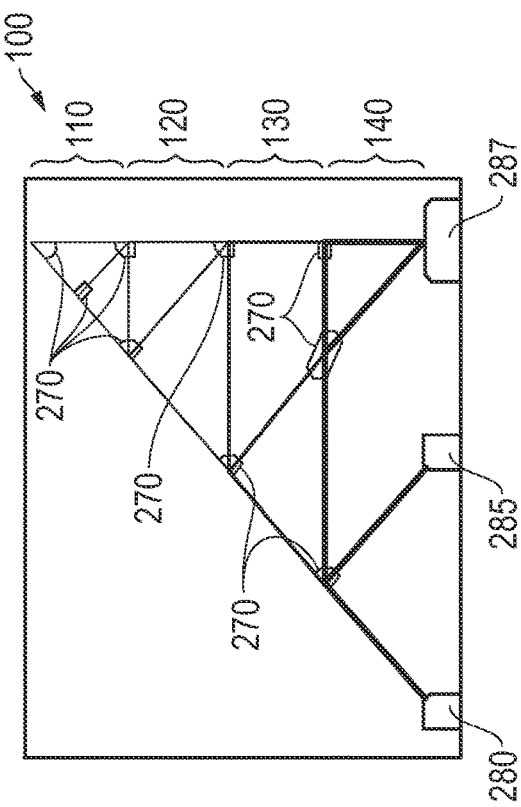
FIG. 2D is a side schematic view of a base module for the frame of FIG. 1, accommodating the modules of FIGS. 2A-2C.

Referring now to FIGS. 2A-2D, side schematic views of frames 100 such as that of FIG. 1 are shown (see FIG. 2D). However, in these views, the frames for various dam heights may be constructed of a single module 110 (see FIG. 2A), two modules (see FIG. 2B), three modules (see FIG. 2C) or four modules as shown in FIGS. 1 and 2D.

FIG. 2A illustrates how a frame might consist of only a single uppermost module 110, for example, where a dam height sought might be fairly shallow, such as below about 11 feet. Where this is the case, the uppermost modular 110 may be delivered to the site and positioned at anchored footings 220, 225, generally with embedded anchor bolts. Note that the footings 220, 225 have been positioned and secured in place at the site in advance of frame positioning, curved panel installation, lateral bracing of adjacent frames, and other dam completion procedures. However, with load and other architectural parameters specific to the project site accounted for during footing positioning and securing, a more standardized utilization of off the shelf modules, structural steel components, prefabricated modular frames, curved panels and other dam components may be taken advantage of as described below.

Referring now to FIG. 2B, a side schematic view of a frame 250 is shown that is made up of a first middle module 120 accommodating the uppermost module 110 of FIG. 2A. Thus, a frame 250 is shown that may be under about 22 total feet in height, likely close to 20. Further, the frame 250 is secured to anchored footings 240, 245. These footings 240, 245 may differ from those 220, 225 given that the frame 250 is different which may be due to reservoir capacity, site or other differences. Regardless, the footings 240, 245 and securing thereof are site and overall dam specific in terms of architecture whereas the modules 120, 110 may again be prefabricated as with other dam components.

Referring now to FIG. 2C, a side schematic view of a frame 275 is shown which includes a second middle module 130 serving as the frame base. Specifically, this module 130 accommodates the frame 250 or modules 120, 110 of FIG. 2A thereover. For this up to 33 foot high embodiment, likely closer to 30, other features come into play. For example, due to the width of the frame 275, the anchored footings 260, 265, 267 are now three instead of two. Further, all members 131, 135, 137 are independently secured to footings 260, 265, 267. This is in contrast to the base modules 110 and 120 of FIGS. 2A and 2B for which the support frames were anchored to the rearward footings 225, 245 in conjunction with the corresponding vertical members. Regardless, it is again the footings 260, 265, 267 which take on the load and site specific architectural considerations such that the frame 275 there above may be constructed of primarily prefabricated modular components such as the illustrated modules 130, 120, 110.

Referring now to FIG. 2D, a side schematic view of the base module 140 accommodating the other modules 130, 120, 110 for the frame 100 of FIG. 1 is shown. The frame 100 is a total of under about 44 feet in height, likely closer to a total of 40 with each module 140, 130, 120 and 110 being about 10 feet high. The frame 100 is similar to the likely 30 foot frame 275 of FIG. 2C in the use of three separate anchored footings 280, 285, 287 accommodating the frame 100. Of course, the footings 280, 285, 287 may be of entirely different architecture, size or manner of installation given that the frame 100 of FIG. 2D is likely about ten feet higher than the frame 275 of FIG. 2C. Nevertheless, the frame 100 is of repeatable, prefabricated, modular components with the more precise specifications and design planning focus being on aspects related to the footings 280, 285, 287 and their placement.

Figure 3:
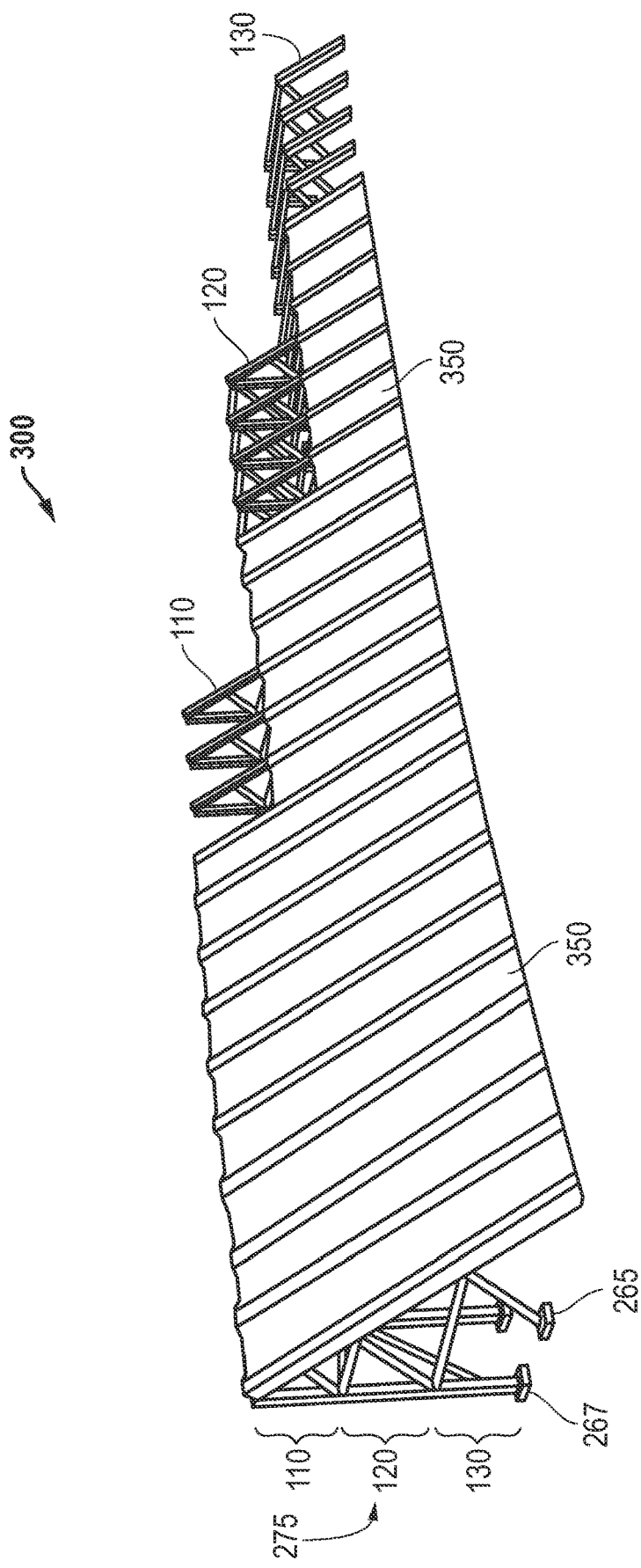
FIG. 3 is a perspective view of an embodiment of a dam under construction and employing frames constructed of modules illustrated in FIG. 2C.
Figure 4:
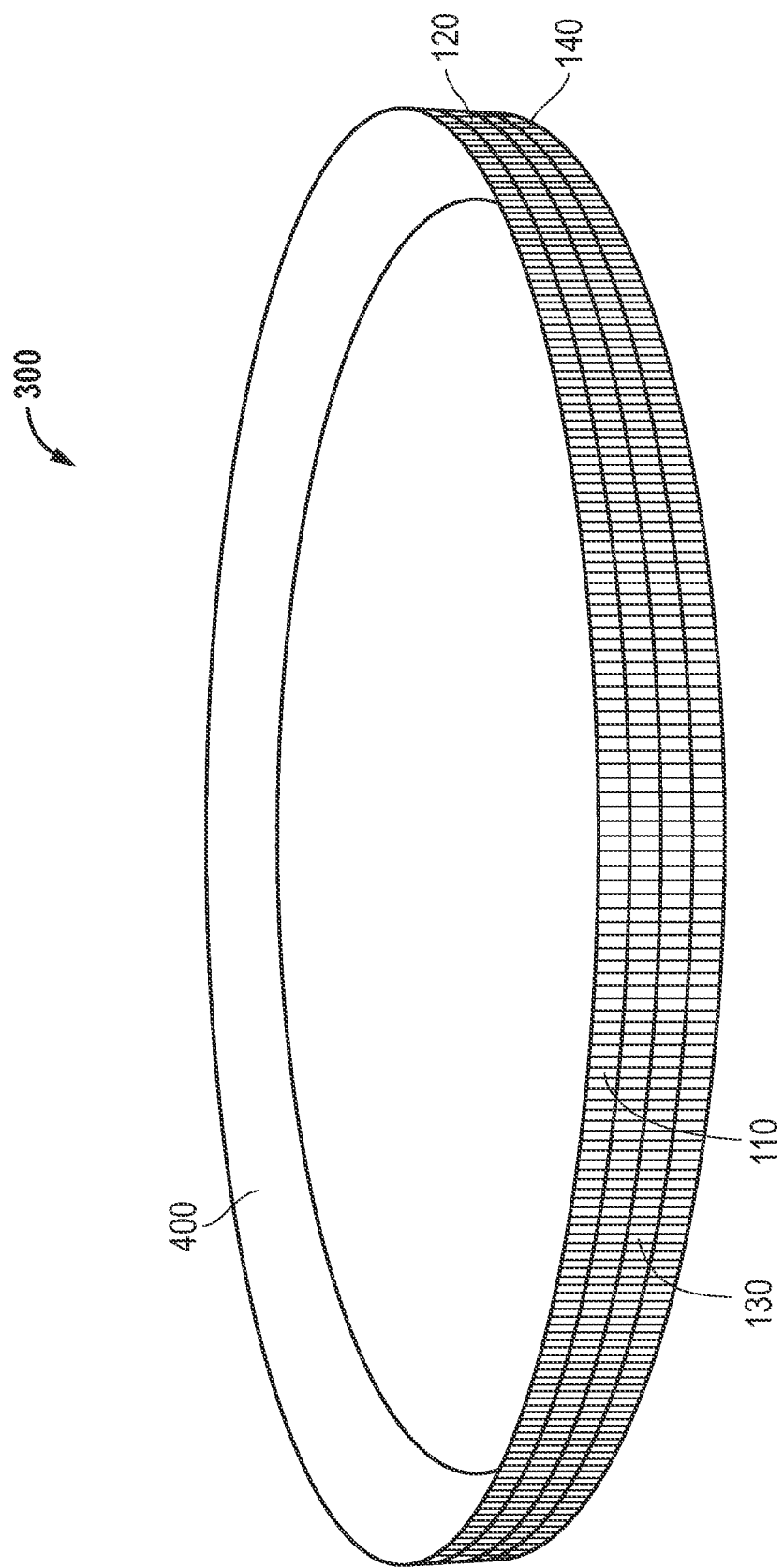
FIG. 4 is a perspective view of an embodiment of the dam of FIG. 3 upon completed construction.

With reference to each of FIGS. 2A-2D, it is worth noting that for the depicted embodiment, under about 11 feet of vertical height is found for each module 110, 120, 130, 140. However, as described above, the width of the modules 110, 120, 130, 140 is ever increasing with the uppermost module being under about 11 feet wide, likely about 10. The first middle module 120 has a width of under about 22 feet, likely about 20. This is in line with the idea that a first middle module 120 is a modular unit about 10 feet high that is configured to support another modular unit (e.g. 110) that is another 10 feet high as described above. That is, for the depicted embodiments, the overall width of the frame (e.g. 100) will be substantially that of the overall vertical height. As a matter of structural soundness, this may be of benefit for buttress frames (e.g. 100) to support a dam 300 such as depicted in FIGS. 3 and 4. Along these lines, this also translates into a width of under 33 feet (e.g. about 30 feet) for the second middle module 130 and a width of under 44 feet (e.g. about 40 feet) for the base module 140.

Referring now to FIG. 3, a perspective view of an embodiment of a dam 300 under construction is illustrated. The dam 300 is utilizing buttress frames 275 as illustrated in FIG. 2C. Thus, the second middle module 130 is provided as a base. The dam 300 is installed piece by piece from base modules 130 to the crest as illustrated, generally from right to left (as shown) or left to right.

Note the securing to the footings 260, 265, 267 near the left of the construction site by base plate and bolted anchor connection. Specifically, such hardware may be provided during prefabrication whereas the footings 260, 265, 267 may constitute concrete foundations with embedded anchors being cast in place prior to the installation of the base module 130. First middle modules 120 are secured over the base modules 130 and uppermost modules 110 are provided above the first middle modules 120. Adjacent frames are laterally braced during installation. This process is continued in an easy to deliver, repeatable manner with off the shelf components.

With added reference to FIG. 1, the same holds true for cylindrically curved face plate panels 350 which are installed at the face members 117, 127, 137 of the frames 275 (see FIG. 2C). The stiffened curved panels 350 are installed such that the concave faces thereof might face the water of a contained reservoir as described further below. Each panel 350 may be an industrial grade steel plate with a predetermined thickness and curvature.

The widths of the panels 350 may range significantly from the toe location at the bottom to the wider region at the crest or top of the dam 300 in order to account for the curvature of the dam 300 in order to accommodate a reservoir (e.g. 500 as shown in FIG. 5). The panels 350 may include stiffeners and be welded to flanges of the inclined member frame 275 to help ensure watertightness.

The use of modular construction as described may decrease reservoir construction cost and significantly shorten construction time, particularly for more common 50-500 MW pumped storage hydropower systems. By way of example, with a supply of prefabricated components as described, construction time may be well under a one year window of time.

Figure 5A:
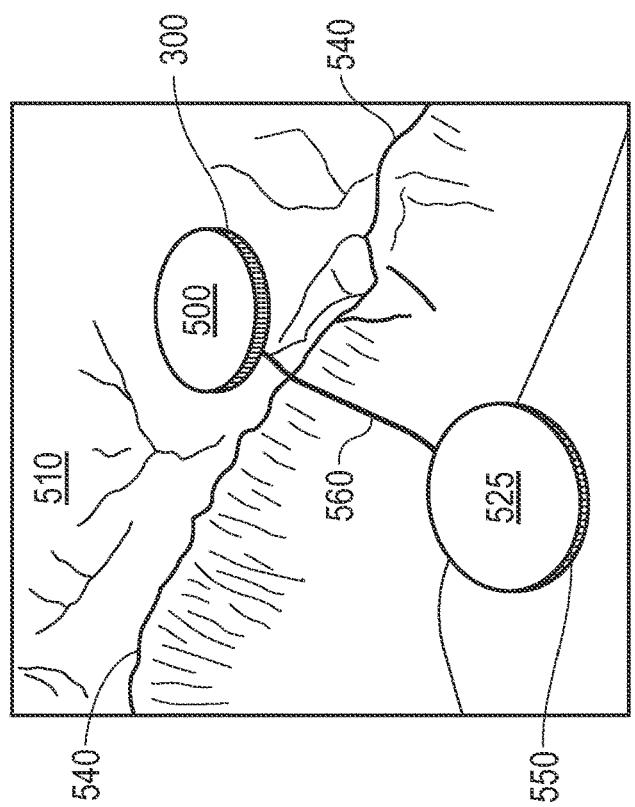
FIG. 5A is a perspective overview of a multiple reservoir closed loop pumped storage hydropower plant utilizing dams of FIG. 4.

Referring now to FIG. 4, a perspective view of an embodiment of the dam 300 of FIG. 3 is shown upon completed construction. The illustrated shape is circular. However the configuration may be off any various shapes depending on the nature of the installation environment, particularly in terms of geography and ground composition. The modularly completed dam 300 with installed panels 350 as shown in FIG. 3 reveals a water retaining surface in the form of an inwardly sloping incline 400 that helps to define and retain water of the reservoir (e.g. 500 as shown in FIG. 5A). In this case, the dam 300 is about 40 feet high, including all modules 110, 120, 130, 140 of the frame 100 as also shown in FIGS. 1 and 2D.

Referring now to FIG. 5A, a perspective overview of a multiple reservoir closed loop pumped storage hydropower system is shown utilizing dams 300, 550 as shown in FIG. 4. The system is situated at a plant site 510 of differing elevations. Specifically, as illustrated, a natural ridge 540 is found at the site 510 such that one reservoir 500 at one side of the ridge 540 may be situated at a substantially higher elevation than another reservoir 525 of the system. The reservoirs 500, 525 are contained by dams 300, 550 as noted and a hydraulic connection 560 is found between the reservoirs 500, 525.

The dams 300, 550 are circular structures modularly delivered and installed. As indicated above, the panels 350 of FIG. 3 are welded and sealed to the underlying frames 100 such as shown in FIG. 1. Thus, a sloping incline 400 as shown in FIG. 4 is provided for containing water of each reservoir 500, 525. The panels 350 are also sealed at the base of each reservoir 500, 525 in a reinforced concrete toe to further ensure watertightness. With the availability of the modular system as described, reservoir construction time may be dramatically reduced, for example, to less than a year's time.

When combined with a streamlined plant approval process, for example in circumstances where high order streams at the site 510 are avoided, this means that return on investment for the plant may begin in a dramatically shorter period of time as compared to other conventional plants constructed of non-modular reservoir dams. This is particularly noteworthy given the dramatic scale of such projects. For example, in the embodiment illustrated, each reservoir 500, 525 may cover more than 100 acres and store more than 5,000 acre-feet of water. More specifically, the dams 300, 550 are each of a 40 foot high variety covering over 130 acres and each with a working capacity of over 4,000 acre-feet of water. Further, in the embodiment illustrated, the elevation variance between the locations of the reservoirs 500, 525 is between about 1,000 and 1,400 feet and the hydraulic connection 560 is a conduit spanning over 5,000 feet.

Figure 5B:
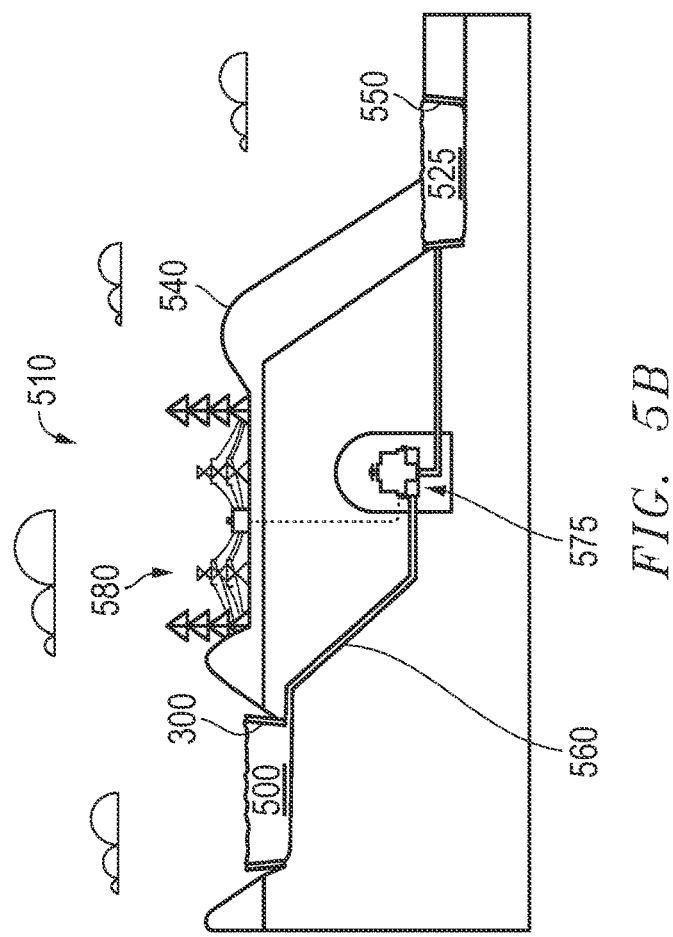
FIG. 5B is a side cross-sectional view of the hydropower plant of FIG. 5A.

Referring now to FIG. 5B, a side cross-sectional view of the hydropower plant of FIG. 5A is shown. In this view, a pump-turbine system 575 is shown coupled to an electrical distribution plant 580 or grid. As described above, during periods of excess power availability, water from the lower reservoir 525 may be driven by the turbine system 575 to the upper reservoir 500. In one embodiment, the turbine system 575 is supplied by a power house configured for 500 MW. Regardless, this means that when periods of higher power demand arise, water from the upper reservoir 500 may be released through the hydraulic connection 560 to the turbine system 575, ultimately discharging to the lower reservoir 525. As a result, power may be delivered to the distribution plant 580 from the turbine system 575 at a time of higher demand when the power is most needed. Again, while only exemplary, for the setup described this may equate to a 4,000 MWh return of power over a period of over about 8 hours.

Though only exemplary, for the embodiment shown, this means that off-site power or power from intermittent sources such as solar and wind may be used to drive the water from the lower reservoir 525 to the upper reservoir 500 periodically during periods of lower power needs. Thus, potential energy has been directed to the upper reservoir 500 to be released during a greater period of need, effectively turning intermittent power into a reliable source when needed most.

Referring now to FIG. 6, a side view of a transport unit 600 is shown accommodating a packaged module 620 for a frame to facilitate construction of a dam 300 such as that of FIGS. 3-5B. The package 620 may include any number of modules of the same or different types as shown in FIG. 1 (e.g. 110, 120, 130, 140). However arranged, the package 620 may still be kept to under 11 feet in height (d'). This means that along a standard path or roadway 650, even the presence of a minimum standard 14 foot clearance (C) at an overpass 675, does not present an obstacle to package transportation even though only a conventional 18 wheeler flatbed 600 is utilized as the transportation unit. This is because the actual flatbed 610 may be kept to 4 feet or less above the ground surface (see distance (d)) without any special measures. As a result, the total height (D) of the transport may be kept to under 14 feet, even in circumstances where the package 620 includes vertically upright modules 110, 120, 130, 140 (see FIG. 1).

Of course, modules 110, 120, 130, 140 as shown in FIG. 1 may be arranged horizontally and/or stacked when placed on the flatbed 610. In such circumstances, this means that the horizontal space occupied by the package 620 or such modules may be kept to under about 11 feet. Thus, where the concern transitions from one of clearance (C) at an overpass 675 to one of how much space is taken up across lanes on a roadway, the amount of space is still kept to a safely acceptable 11 feet or less. With a standard flatbed 610 of 8.5 feet in width, no more than 2.5 feet of modular packaging would extend unsupported (e.g. about 1.25 feet on each side at most). Therefore, not only does the manner of assembly greatly reduce construction time as described above, the mode of transport may readily be achieved through use of commonly available transport means without any special modifications required.

Figure 7:
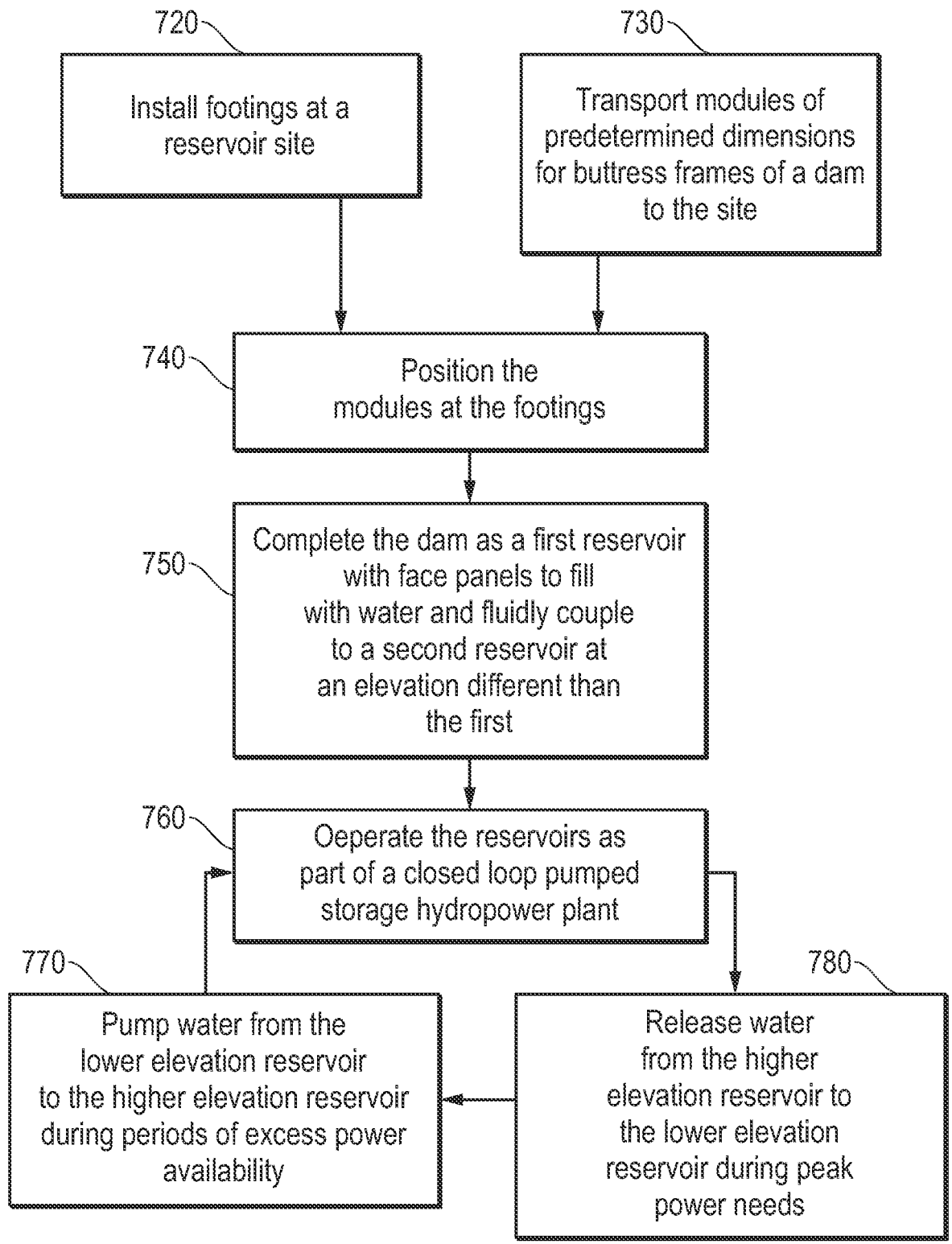
FIG. 7 is a flow-chart summarizing an embodiment of transporting modules and constructing dams for a multiple reservoir closed loop pumped storage hydropower plant.

Referring now to FIG. 7, a flow-chart is shown summarizing an embodiment of transporting modules and constructing dams for a multiple reservoir closed loop pumped storage hydropower plant. As indicated at 720, preparation of the reservoir site and installation of footings to support the reservoir hardware are achieved separately from the assembly of the reservoir itself. In this way, repeatably predictable use of prefabricated modules may be employed for dam construction by initial placement of modules at the footings (see 740). Of course, this also means that the modular hardware may be transported to the site as noted at 730 in an efficient manner due to predetermined modular dimensions that are also tailored to ease of transport without requiring more specialized modes of transport.

The dam may continue to be completed to support a reservoir as indicated at 750 which is hydraulically connected to another reservoir at a different elevation. Of course both reservoirs may be constructed of such modular components. With the remainder of plant construction completed, the reservoirs may then be run in cooperation as a closed loop pumped storage hydropower plant. As indicated at 770, this may include pumping water from the lower elevation reservoir to the higher elevation reservoir during periods of excess power capacity. Thus, as noted at 780, water from the higher elevation reservoir is available for returning to the lower elevation reservoir in a manner that provides power during peak power needs.

Embodiments described hereinabove include modular components and techniques that allow for the efficient transportation and assembly of a dam at a closed loop pumped storage hydropower plant site. The components and techniques allow for dramatically reduced cost of completion, particularly in terms of time and labor. This reduction in completion times allows for the ability to take advantage of streamlined power plant approval times where available.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Regardless, the foregoing description should not be read as pertaining only to the precise structures described and shown in the accompanying drawings, but rather should be read as consistent with and as support for the following claims, which are to have their fullest and fairest scope.

We claim:

1. A closed loop pumped storage hydropower system comprising:
    a first reservoir;
    a second reservoir hydraulically linked to the first reservoir;
    a plurality of structural modules comprising buttress frames for at least one dam retaining at least one of the reservoirs, each of the modules occupying no more than about 14 feet in vertical height above a surface of a path to the site during transport and no more than about 11 feet in horizontal width across the path during the transport; and
    prefabricated panels interfacing one another and welded to the frames of the at least one dam, the at least one dam of a circular configuration and the panels of predetermined curvatures tailored to the circular configuration of the at least one dam, wherein the panels comprise a crest near the top of the dam and a toe near the base of the dam with the crest being wider than the toe.

2. The system of claim 1 wherein the first reservoir is at an elevated location in relation to the second reservoir.

3. The system of claim 1 further comprising a turbine system coupled to a conduit comprising the hydraulic link between the reservoirs.

4. The system of claim 3 wherein the turbine system is coupled to a power plant for distribution of power thereto when effectuated by gravitationally driven water flowing through the conduit.

5. The system of claim 1 wherein the frames steel buttress frames.

* * * * *